July 1, 1930.  B. H. SMITH  1,769,471
FORK
Filed Aug. 26, 1929
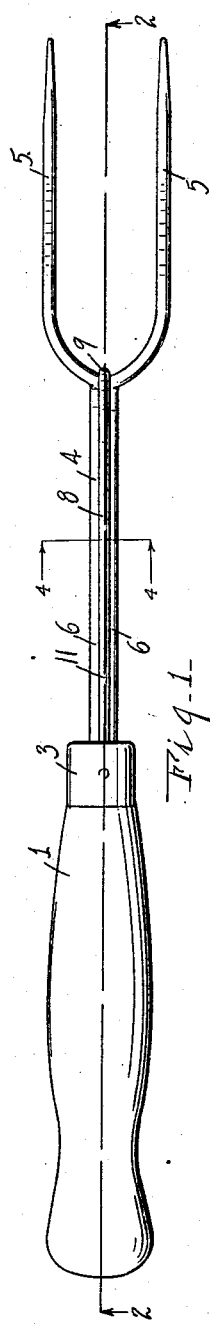
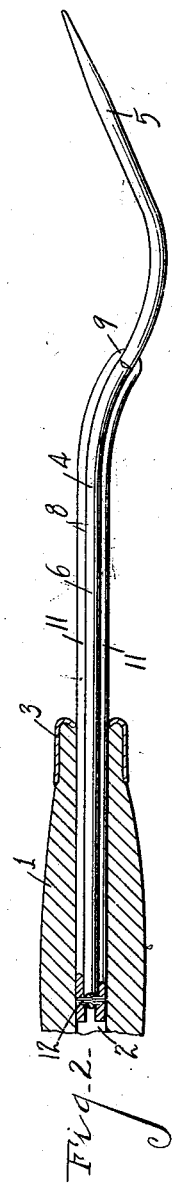
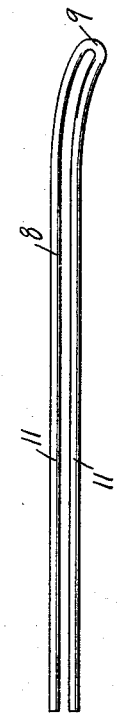
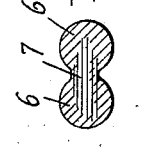
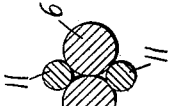
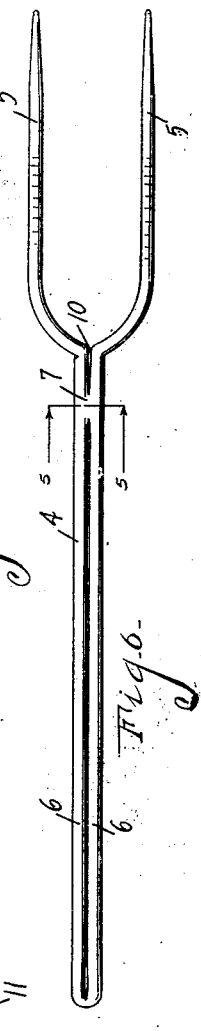
INVENTOR
Benjamin H. Smith
BY
ATTORNEYS Patented July 1, 1930

1,769,471

UNITED STATES PATENT OFFICE

BENJAMIN H. SMITH, OF NILES, MICHIGAN, ASSIGNOR TO MICHIGAN WIRE GOODS COMPANY, OF NILES, MICHIGAN

FORK

Application filed August 26, 1929. Serial No. 388,593.

The main object of this invention is to provide a fork or like implement which may be very economically produced, is strong and durable, and attractive in appearance.

Objects pertaining to details and economies of my invention will definitely appear from the description to follow. The invention is defined in the claim.

A structure which embodies my improvements is clearly illustrated in the accompanying drawing, in which:

Fig. 1 is a front view of a fork embodying the features of my invention.

Fig. 2 is a fragmentary view partially in longitudinal section on line 2—2 of Fig. 1.

Fig. 3 is a side view of the reinforcing element.

Fig. 4 is a cross section on line 4—4 of Fig. 1.

Fig. 5 is a cross section on lne 5—5 of Fig. 6.

Fig. 6 is a front view of the combined tine and shank member.

In the embodiment illustrated in the accompanying drawing the handle 1 is formed of wood and is provided with a bore-like socket 2, the handle being reinforced with a ferrule 3. The combined tine and shank member 4 is formed of wire folded upon itself with the ends of the arms offset and conformed to provide tines 5. The arms 6 of this member are secured together adjacent the bases of the tines by soldering or welding at 7.

I provide a reinforcing member 8 formed of wire folded upon itself into an elongated loop, this reinforcing member being arranged with its bight 9 engaging the crotch 10 of the tines and its arms 11 nesting with the arms 6 of the shank and preferably welded thereto at 12.

In practice the assembled shank and reinforcing member are tinned or otherwise finished as a unit so that the joint between the parts is effectively closed. The gage of the reinforcing member is considerably less than that of the shank and tine element so that it nests therewith.

I thus provide a structure which is very attractive in appearance, is strong and rigid, and may be very economically produced.

Having thus described my invention what I claim as new and desire to secure by Letters Patent is:

In a fork, the combination of a combined tine and shank member formed of wire folded upon itself with a portion of its arms lying side by side providing a shank and the ends of its arms oppositely offset providing tines with a crotch at the base thereof, the arms of the shank being secured together adjacent the tines, and a reinforcing member formed of wire folded upon itself providing spaced shank arms and a crotch engaging bight, said reinforcing member being arranged on the shank with its bight in engagement with the crotch of the tines and its arms in nesting relation with the arms of the shank and fixed thereto.

In witness whereof I have hereunto set my hand.

BENJAMIN H. SMITH.